United States Patent [19]
Johnson

[11] Patent Number: 5,367,739
[45] Date of Patent: Nov. 29, 1994

[54] OSCILLATING AIR BLOWERS FOR DRYING VEHICLES

[76] Inventor: Archie L. Johnson, 7601 N. Central Ave., #28, Phoenix, Ariz. 85020

[21] Appl. No.: 90,772

[22] Filed: Jul. 13, 1993

[51] Int. Cl.[5] .............................. F26B 5/00
[52] U.S. Cl. ........................ 15/316.1; 34/666
[58] Field of Search ............... 15/312.1, 316.1; 34/243 R

[56] References Cited

U.S. PATENT DOCUMENTS

| | | | |
|---|---|---|---|
| 2,637,873 | 5/1953 | Berezny | 15/316.1 X |
| 2,976,557 | 3/1961 | King | 15/312.1 |
| 3,525,117 | 8/1970 | Gleaton | 15/312.1 |
| 4,161,801 | 7/1979 | Day et al. | 15/316 R |
| 4,393,602 | 7/1983 | Smith | 15/316.1 X |
| 4,587,688 | 5/1986 | Gougoulas | 15/316 R |
| 4,685,169 | 8/1987 | Nelson | 15/312.1 X |

OTHER PUBLICATIONS

Hanna Car Wash International advertisement published on or before Nov. 26, 1991, and entitled "Hanna American Cone Dryers for the 90's".
Preferred Drying Systems, Inc. advertisement published in Mar., 1990 in Auto Laundry News, p. 33, and describing the PDS Aerojet and Mighty Jet Dryers.
Worldwide Car Cleaning advertisement published in Oct. 1991 in Auto Laundry News, p. 44, and describing the "Aerojet Touchless Dryer".
Superior Car Wash Systems, Inc. brochure for "High'n'dry" turbine dryers bearing 1989 copyright notice.

Primary Examiner—Chris K. Moore
Attorney, Agent, or Firm—Cahill, Sutton & Thomas

[57] ABSTRACT

A vehicle drying blower assembly includes a series of oscillating centrifugal fans each powered by a blower motor. Each centrifugal fan includes a circular fan rotated upon a driveshaft and surrounded by a housing having a discharge nozzle; the housing that surrounds the circular fan is supported by a rocker arm for pivotal movement about an axis of rotation coaxial with the circular fan driveshaft. The rocker arm pivots about a bearing assembly that lies coaxial with the driveshaft of the blower motor. A drive motor rotates an eccentric crank arm, and link rods coupled between the eccentric crank arm and the housing rocker arms simultaneously oscillate each centrifugal fan to blow moisture from the vehicle.

8 Claims, 3 Drawing Sheets

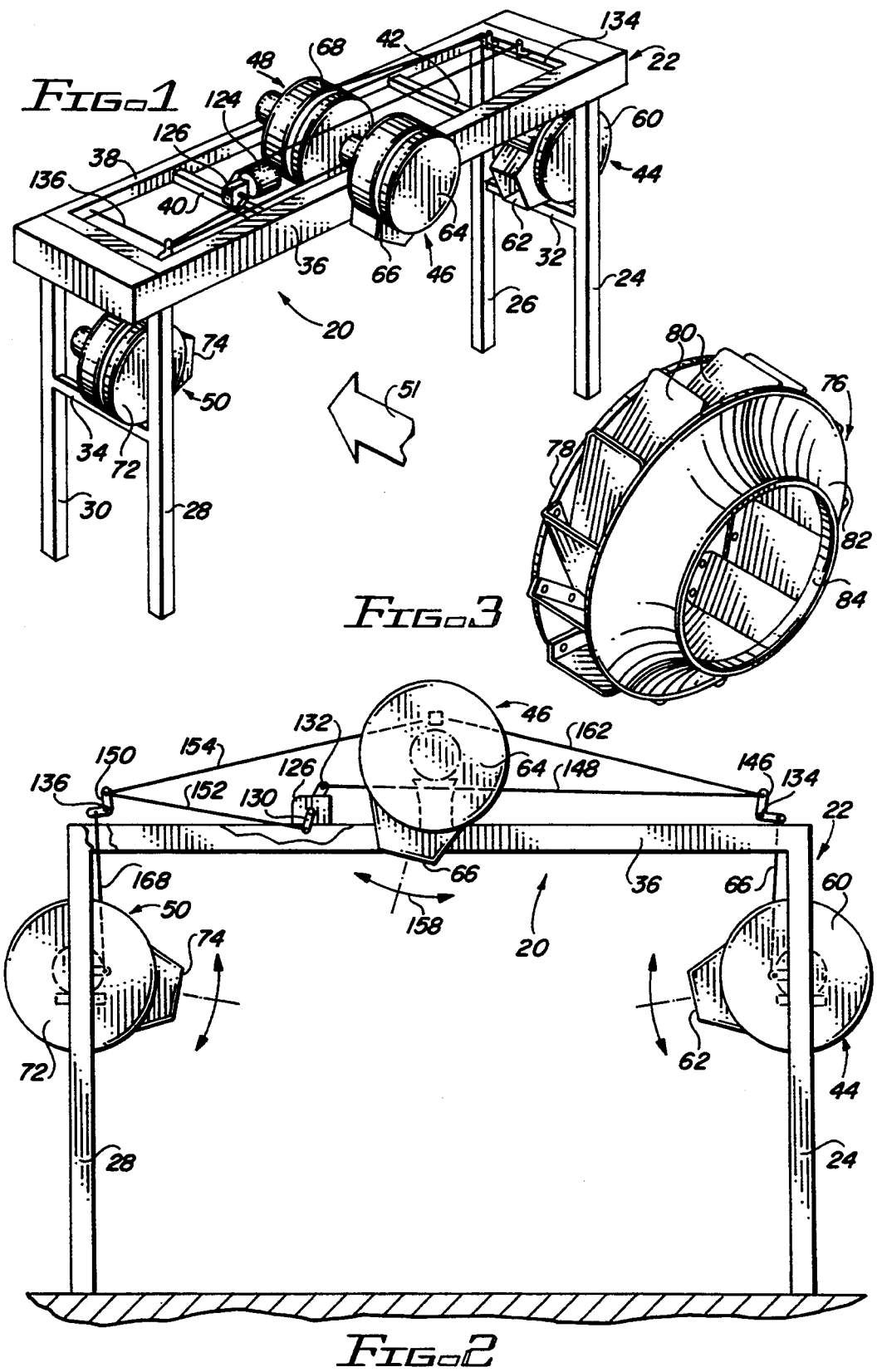

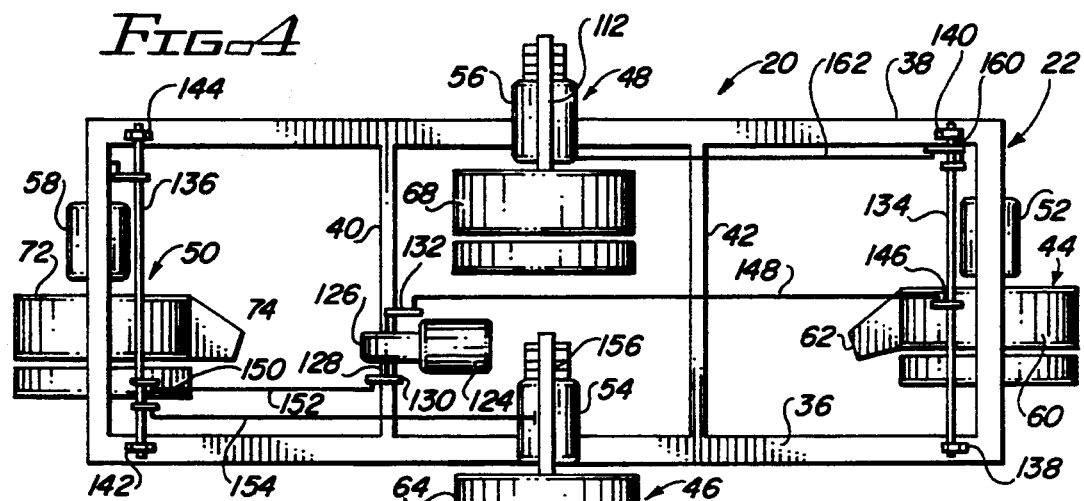
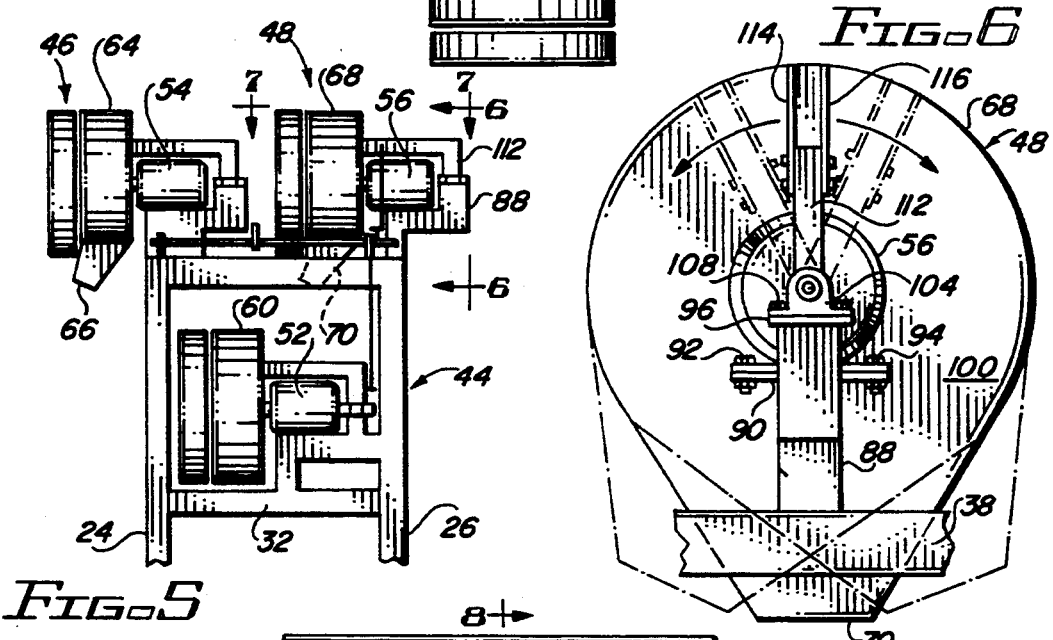
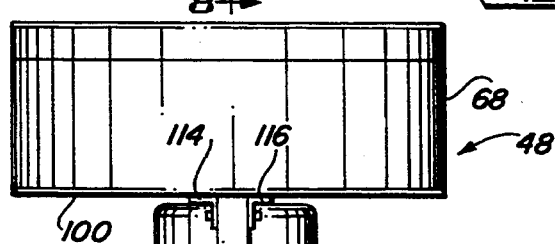

OSCILLATING AIR BLOWERS FOR DRYING VEHICLES

BACKGROUND OF THE INVENTION

1. Field of the Invention

The present invention relates generally to devices for blowing air across the surface of vehicles to dry moisture from such vehicles, and more particularly, to devices which provide an oscillating air flow pattern to cover the entire surface of the vehicle.

2. Description of the Relevant Art

Automated vehicle washing systems have been available for many years to automatically wash and dry vehicles. Large volume vehicle washing systems typically include a conveyor system for moving a vehicle through a series of washing and rinsing stations, and finally, through a drying station which serves to remove moisture from the surface of the vehicle.

A variety of drying stations are known for removing moisture from the vehicle. In one such known drying station, an air duct is pivotally secured to an overhead frame member. The air duct is coupled by flexible hosing to an air blowing device. As the vehicle passes through the drying station, rollers or followers secured to the air duct contacted the upper surfaces of the vehicle and lift the overhead air duct about its pivotal supports to follow the contour of the vehicle. While such drying stations perform the function of drying the vehicle, rather large blower devices must be used to overcome the pressure losses which occur within the flexible hosing. The need for using such large blower devices increases electrical usage and the noise levels associated with such drying stations. Moreover, such drying stations present the disadvantage that the rollers or followers contact the vehicle surface and may potentially scratch the finish or break accessories protruding from the surface of the vehicle. In addition, the flexible hosing that couples the vent to the blower often dries out and cracks open.

So-called touch-free drying stations are also known wherein one or more blower fans are coupled to fixed vents positioned along the sides and above the station. While the fixed vents avoid any contact with the surface of the vehicle, the fixed position vents also have disadvantages. For example, to ensure adequate coverage of the entire vehicle surface, the vent openings of the air blowing fans are often formed with elongated openings measuring two to three feet in length to discharge a wide swath of air. However, because the vent openings are so large, air pressure drops along the ducting between the fans and the vents are so large that either output air flow speed is reduced, or to compensate, larger, more powerful, and noisier fans are required to maintain adequate output air flow.

A third type of drying station is known wherein a single large blower forces air into a distribution manifold to which several oscillating pivoting-cone nozzles are secured. The movable nozzles are engaged by flexible seals to permit movement of the nozzles while preventing air from escaping around the sides of each nozzle. A drive mechanism causes the nozzles to oscillate for emitting a number of oscillating air streams from the distribution manifold. The oscillating streams of air emitted by such nozzles ensure adequate coverage for vehicles having a wide variety of contours. However, due to pressure losses within the distribution manifold, a relatively large blower fan and motor must be used to create a high pressure in the manifold, resulting in significant consumption of electrical power, large power surges when the blower motor turns on and off, and increased noise due to the size of the blower motor required and the drop in pressure through the manifold. Also, the flexible seals used to seal the nozzles to the distribution manifold dry out and crack, resulting in air leaks, lower pressure and extensive maintenance.

Accordingly, it is an object of the present invention to provide a blowing device that provides an oscillating stream of air for drying vehicles and the like while avoiding significant drops in air pressure due to extensive air ducting.

It is another object of the present invention to provide such a blowing device adapted to dry the entire surface of the vehicle without any physical contact between the blowing device and the surface of the vehicle.

It is still another object of the present invention to provide such a blowing device which can operate at reduced air pressures, and hence, lower noise levels, and still provide an oscillating air stream of sufficient pressure to adequately dry the surface of washed vehicles and the like.

A further object of the present invention is to provide such a blowing device that provides an oscillating stream of air and which provides a relatively higher volume of air for a given sized blower fan and operating pressure.

A yet further object of the present invention is to provide such a blowing device which provides oscillating air streams while using a series of smaller horsepower blower motors, as compared with a single larger horsepower blower motor, in order to lessen power surges on the electrical supply lines from which such blower motors are powered.

Still another object of the present invention is to provide such a blowing device which is inexpensive to construct and maintain.

Yet another object of the present invention is to provide such a blowing device which requires relatively little floorspace.

These and other objects of the present invention will become more apparent to those skilled in the art as the description of the present invention proceeds.

SUMMARY OF THE INVENTION

Briefly described, and in accordance with a preferred embodiment thereof, the present invention provides a blowing device for blowing a stream of air in an oscillating flow pattern, and including a frame member for supporting a first motor used to rotate a first driveshaft. A first circular fan is coupled to the first driveshaft for being rotated thereby about a first axis of rotation. The first circular fan has a centrally-located inlet for admitting air, and an outer periphery for discharging air when the first circular fan is rotated by the first motor.

A first housing surrounds the first circular fan for receiving the air discharged from the outer periphery thereof. The first housing includes an outlet nozzle in order to direct air discharged from the first housing in a predetermined direction. A first support mechanism rotatably supports the first housing about an axis of rotation that is coincident with the axis of rotation of the first circular fan to pivotally support the first housing about the first circular fan. Within the preferred embodiment of the present invention, this support mechanism may take the form of a rocker arm secured to the first housing and rotatably supported by a bearing assembly mounted to the frame member. Preferably, the bearing assembly rotatably supports the rocker arm about a pivot axis that is coaxial with the axis of rotation of the first circular fan.

An oscillating mechanism is supported by the frame member and is further coupled to the first housing for causing the first housing to oscillate about the first circular fan in order to blow the stream of air discharged through the nozzle of the first circular fan in an oscillating flow pattern. The oscillating mechanism may include a second motor supported by the frame member for rotating an eccentric crank arm; a linkage coupled between the eccentric crank arm and the rocker arm transmits the orbiting motion of the crank arm into an oscillating rotational motion of the first housing. The oscillating motion of the first housing causes the air stream emitted by the nozzle thereof to oscillate as well.

In the preferred embodiment of the present invention, the blowing device includes at least a second oscillating air stream. The second oscillating air stream is provided by a second circular fan rotated by the driveshaft of a second motor also mounted to the frame member. A second housing encircles the second circular fan for receiving the air discharged therefrom, and includes a second outlet nozzle for directing the air discharged by the second circular fan. A second rocker arm or similar support mechanism rotatably supports the second housing about an axis of rotation coincident with the axis of rotation of the second circular fan to pivotally support the second housing about the second circular fan. The oscillating mechanism includes a second linkage coupled between the orbiting crank arm and the rocker arm supporting the second housing for causing the second housing to oscillate about the second circular fan. The linkages coupled to the orbiting crank arm are arranged to oscillate the first and second housings in opposing rotational directions, causing the two discharged air streams to oscillate 180 degrees out of phase with one another.

BRIEF DESCRIPTION OF THE DRAWINGS

FIG. 1 is a perspective view of a blowing device constructed in accordance with a preferred embodiment of the present invention for directing four oscillating streams of air at the surface of a vehicle.

FIG. 2 is a front view of the blowing device shown in FIG. 1.

FIG. 3 is a perspective view of a circular turbine fan assembly used to create a stream of blown air.

FIG. 4 is a top view of the blowing device shown in FIG. 1.

FIG. 5 is a partial side view of the upper portion of the blowing device shown in FIG. 1.

FIG. 6 is a an enlarged rear view of the rearmost of two upper oscillating fans shown in FIG. 5 and illustrating a rocker arm and bearing assembly for rotatably supporting a housing about the circular fan assembly shown in FIG. 3.

FIG. 7 is a top view of the rocker arm, motor, and fan housing shown in FIG. 6.

DETAILED DESCRIPTION OF THE PREFERRED EMBODIMENT

Figure 8:
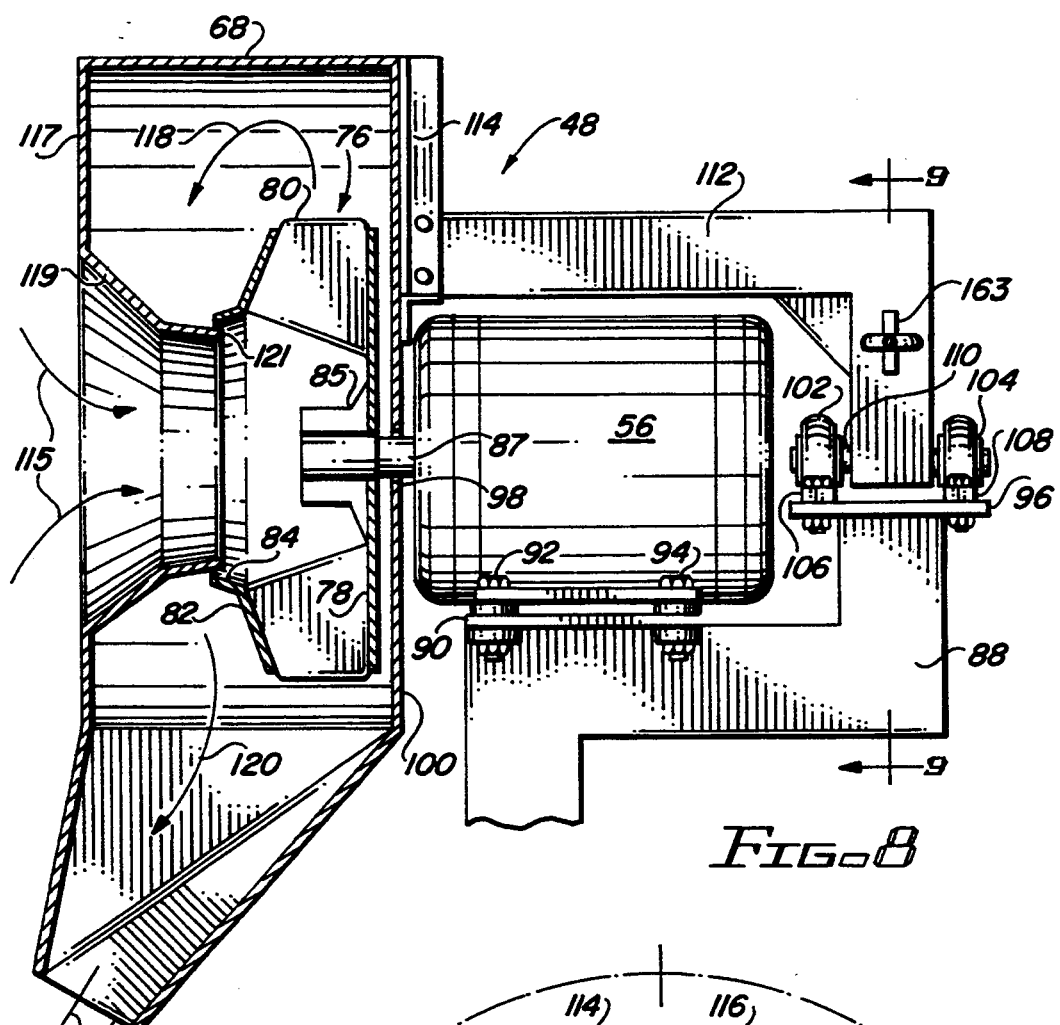
FIG. 8 is a sectional view of the blower motor, circular fan, fan housing, rocker arm, and bearing assembly shown in FIGS. 5–7.

A vehicle drying apparatus for blowing air at the surface of a vehicle is shown in FIGS. 1, 2 and 4, and is designated generally by reference numeral 20 therein. As shown in FIGS. 1, 2 and 4, drying apparatus 20 includes a frame 22 which includes a first pair of vertical standards 24 and 26, and a second pair of opposing vertical standards 28 and 30. Standards 24–30 are selected to be of a height exceeding the height of the tallest vehicle to be advanced through drying apparatus 20. Likewise, standards 24 and 26 are spaced apart from standards 28 and 30 by a distance which exceeds the width of the widest vehicle to be advanced through drying apparatus 20. A horizontal brace 32 extends across standards 24 and 26 approximately at the midpoint of standards 24 and 26. Similarly, a second horizontal brace 34 extends across standards 28 and 30 approximately at the midpoint of standards 28 and 30.

Frame member 22 also includes a first upper horizontally-extending beam 36 spanning between the upper ends of standards 24 and 28, and a second upper horizontally-extending beam 38 spanning between the upper ends of standards 26 and 30. A pair of cross braces 40 and 42 extend horizontally between and normal to upper beams 36 and 38.

Frame member 22 supports four air blowing assemblies 44, 46, 48, and 50. Air blowing assembly 44 is generally supported by brace 32 and directs an oscillating air stream at a first side of a vehicle being advanced through drying apparatus 20. Air blowing assembly 50 is generally supported by brace 34 and directs an oscillating air stream at the opposing second side of the vehicle being advanced through drying apparatus 20. Air blowing assemblies 46 and 48 are generally supported by upper beams 36 and 38, respectively, and direct oscillating air streams at the upper surfaces of a vehicle being advanced through drying apparatus 20. The vehicle is preferably advanced through vehicle drying apparatus 20 in the direction indicated by enlarged arrow 51. Air blowing assemblies 46 and 48 are operated to direct such air streams 180 degrees out of phase with one another in a manner described in greater detail below.

Referring to FIGS. 1, 4 and 5, each of blowing assemblies 44–50 includes its own electric motor. Blowing assembly 44 includes motor 52 supported by brace 32, blowing assembly 46 includes motor 54 supported by upper beam 36, blowing assembly 48 includes motor 56 supported by upper beam 38, and blowing assembly 50 includes motor 58 supported by brace 34. In the preferred embodiment of the present invention, each of motors 52–58 is a 10 horsepower motor of the type commercially available from Baldor Industrial Motor of Ft. Smith, Ark. under Catalog No. M3312T. Such electric motors may be operated from a 220V AC electrical supply, draw approximately 25 Amps. of current, and rotate at approximately 3,450 RPM.

Each of blowing assemblies 44–50 also includes a fan housing, also known as a fan cage, having a nozzle for directing air discharged from the fan housing in a predetermined direction. For example, blowing assembly 44 includes a fan housing 60 having air discharge nozzle 62; blowing assembly 46 includes a fan housing 64 having air discharge nozzle 66. Likewise, blowing assembly 48 includes a fan housing 68 having air discharge nozzle 70 (see FIGS. 5 and 6), and blowing assembly 50 includes a fan housing 72 having air discharge nozzle 74. Referring briefly to FIG. 8, nozzle 70 of fan housing 68 is directed downwardly and toward the front of vehicle drying apparatus 20, i.e., in a direction opposite to the direction indicated by arrow 51 in FIG. 1; thus, moisture on the surface of a vehicle is blown toward the rear portions of the vehicle that have not yet passed through vehicle drying apparatus 20, rather than toward the forward portions of the vehicle that have already been dried.

Housed within each of fan housings 60, 64, 68, and 72 is a circular fan 76 having the form shown in FIGS. 3 and 8. Circular fan 76, also known as an impeller, is preferably formed of aluminum sheet metal components that are MIG welded together; the use of aluminum components minimizes the weight of circular fan 76 for achieving quick starting and lowering power consumption. Circular fan 76 includes an aluminum backing plate 78 to which a series of aluminum vanes 80 are secured. As shown in FIG. 3, one side edge of each vane 80 is bent at a right angle to abut backing plate 78 and is secured thereto by welds or rivets. Circular fan 76 also includes a front inlet ring 82 secured to the opposing side edge of each vane 80. Front inlet ring 82 includes a centrally-located aperture or inlet 84 for admitting air to the fan assembly. In addition, a hub 85 (see FIG. 8) extends centrally from backing plate 78 within circular fan 76 for receipt of a driveshaft extending from the motor used to rotate circular fan 76; as shown in FIG. 8, motor driveshaft 87 extends through backing plate 78 and is secured within hub 85 for rotating circular fan 76 about an axis of rotation coincident with driveshaft 87. Circular fan 76 has an outer periphery corresponding to the outermost ends of vanes 80. Vanes 80 cause air to be discharged from the outer periphery of circular fan 76 when circular fan 76 is rotated in a counter-clockwise direction (relative to FIG. 3) by its associated motor. Of course, the tilt angle of vanes 80 may be reversed, if desired, for discharging air when the circular fan is rotated in a clockwise direction. Each such circular fan 76 creates an airflow of approximately 4,000 cubic feet per minute.

The manner by which the fan housings 60, 64, 68, and 72 are supported about each of the circular fans 76 will now be described in greater detail in conjunction with FIGS. 6–9. As shown in FIGS. 5, 6, and 8, a support bracket 88 is secured to and extends upwardly from upper horizontal beam 38, and the base of motor 56 is secured to a first horizontal flange 90 of support bracket 88 as by bolts 92 and 94. Driveshaft 87 of motor 56 extends through an oversized aperture 98 formed in the rear wall 100 of fan housing 68; as described above, the end of driveshaft 87 opposite motor 56 extends within and is secured to hub 85 for rotating circular fan 76.

Support bracket 88 also includes a second horizontal flange 96 spaced rearwardly from first horizontal flange 90 and disposed at a slightly higher elevation than first horizontal flange 90. Second horizontal flange 96 supports a bearing assembly including ball bearing units 102 and 104 each secured to flange 96 as by bolts 106 and 108, respectively. Bearing units 102 and 104 pivotally support a pivot shaft 110 extending therebetween about an axis of rotation that is essentially coincident with the axis of rotation of motor driveshaft 87.

Still referring to FIGS. 6–9, an L-shaped support arm, or rocker arm 112, has one end of the vertical leg thereof firmly secured to pivot shaft 110 for rotation therewith. The opposing end of the horizontal leg of rocker arm 112 is firmly secured to rear wall 100 of fan housing 68, as by a pair of aluminum angle brackets 114 and 116 riveted to rocker arm 112 and welded to rear wall 100 of fan housing 68. In this manner, rocker arm 112, pivot shaft 110, and bearing units 102 and 104 provide a means for rotatably supporting fan housing 68 about an axis of rotation that is coincident with, and coaxial with, the axis of rotation of motor driveshaft 87 in order to pivotally support fan housing 68 about circular fan 76.

As shown in FIG. 8, fan housing 68 is generally circular and encircles circular fan 76. Fan housing 68 is also preferably formed of aluminum components to minimize the weight thereof. As indicated in FIG. 8, the front wall 117 of fan housing 68 opens into an inwardly-tapered wall, or inlet cone 119, to admit fresh air, designated by arrows 115, into fan housing 68. The innermost edge 121 of inlet cone 119 has an outer diameter slightly smaller than the inner diameter of inlet opening 84 of front inlet ring 82 of circular fan 76 for allowing inlet cone 119 to extend within, but out of contact with, front inlet ring 82. In this manner inlet cone 119 of fan housing 68 passes fresh air into the central inlet opening of circular fan 76.

As indicated by arrows 118 and 120 in FIG. 8, fan housing 68 receives and collects air discharged from the outer periphery of circular fan 76, and directs such discharged air toward outlet nozzle 70. Outlet nozzle 70 discharges an air stream in a predetermined direction as indicated in FIG. 8 by arrow 122.

As shown best in FIGS. 6–8, outlet nozzle 70 of fan housing 68 is centrally aligned with the axis of rotation through which motor driveshaft 87 and pivot shaft 110 both pass. Thus, as indicated by the dashed lines extending from nozzles 62, 66, and 74 in FIG. 2, each such nozzle directs a stream of air along a path extending generally radially outwardly from the axis of rotation about which each such fan is rotated. As shown best in FIGS. 6 and 8, nozzle 70 includes an inlet opening disposed closest to the outer periphery of circular fan 76 for receiving discharged air, and includes an outlet opening opposite the inlet opening for releasing the discharged air, as indicated by arrow 122. The inlet opening of nozzle 70 shown in FIG. 8 is larger than the outlet opening, and nozzle 70 tapers from the inlet opening toward the outlet opening; thus, air is compressed as the air is discharged through nozzle 70.

It will be recalled that an aspect of the present invention is to provide one or more oscillating air streams without resulting pressure losses due to extensive ducting. Those skilled in the art will appreciate that the air stream emitted by nozzle 70 of fan housing 68 has little pressure loss because there is no extensive ducting, apart from fan housing 68 itself. The manner by which air stream 122 emitted by nozzle 70 (see FIG. 8) is caused to oscillate is described in greater detail below.

Referring to FIGS. 1, 2 and 4, a drive motor 124 is supported by brace 40 of frame member 22. Drive motor 124 may be a relatively small one-half horsepower electric motor. Drive motor 124 rotates the input shaft of a gear box 126 which lowers the output RPM of motor 124 to a speed of approximately 70 RPM. An output crankshaft 128 extends in opposing directions from gear box 126, and a pair of eccentric bell crank arms 130 and 132 extend from each end of crankshaft 128 for rotation therewith. As shown in FIGS. 2 and 4, crank arms 130 and 132 may extend in opposite directions from each other, although crank arms 130 and 132 may also extend in the same direction, if desired.

In the preferred embodiment of the present invention, the apparatus for oscillating blower assemblies 44–50 also includes a pair of jack shafts 134 and 136. Jack shaft 134 extends above and across upper beams 36 and 38 proximate vertical standards 24 and 26, and is rotatably supported by a pair of pivot bearings 138 and 140. Likewise, jack shaft 136 extends above and across upper beams 36 and 38 proximate vertical standards 28 and 30, and is rotatably supported by a pair of pivot bearings 142 and 144. An L-shaped crank member 146 is secured to jack shaft 134, and one end of crank member 146 is connected by a drive rod 148 to bell crank arm 132. Accordingly, rotation of bell crank arm 132 toward vertical standards 24 and 26 causes crank member 146 and jack shaft 134 to rotate clockwise (relative to FIG. 2), while rotation of bell crank arm 132 away from vertical standards 24 and 26 causes crank member 146 and jack shaft 134 to rotate in the opposite rotational direction (i.e., counterclockwise relative to FIG. 2).

Similarly, L-shaped crank member 150 is secured to jack shaft 136, and one end of crank member 150 is connected by a drive rod 152 to bell crank arm 130. Accordingly, rotation of bell crank arm 130 toward vertical standards 28 and 30 causes crank member 150 and jack shaft 136 to rotate counter-clockwise (relative to FIG. 2), while rotation of bell crank arm 130 away from vertical standards 28 and 30 causes crank member 150 and jack shaft 136 to rotate in the opposite rotational direction (i.e., clockwise relative to FIG. 2).

A link rod 154 extends between crank member 150 and the rocker arm 156 that supports fan housing 64. Thus, as bell crank arm 130 is rotated by motor 124, crank member 150 is oscillated by drive rod 152, and this oscillating movement is transmitted to link rod 154, which causes rocker arm 156 to pivot back and forth about its bearing axis. Fan housing 64 is therefore caused to rotate back and forth around the circular fan spinning therein, and in this manner, nozzle 66 of fan housing 64 swings back and forth, as indicated by arrow 158 in FIG. 2. Of course, while link rod 154 is shown being coupled to rocker arm 156, link rod 154 may also be directly coupled to fan housing 64, if desired.

Figure 9:
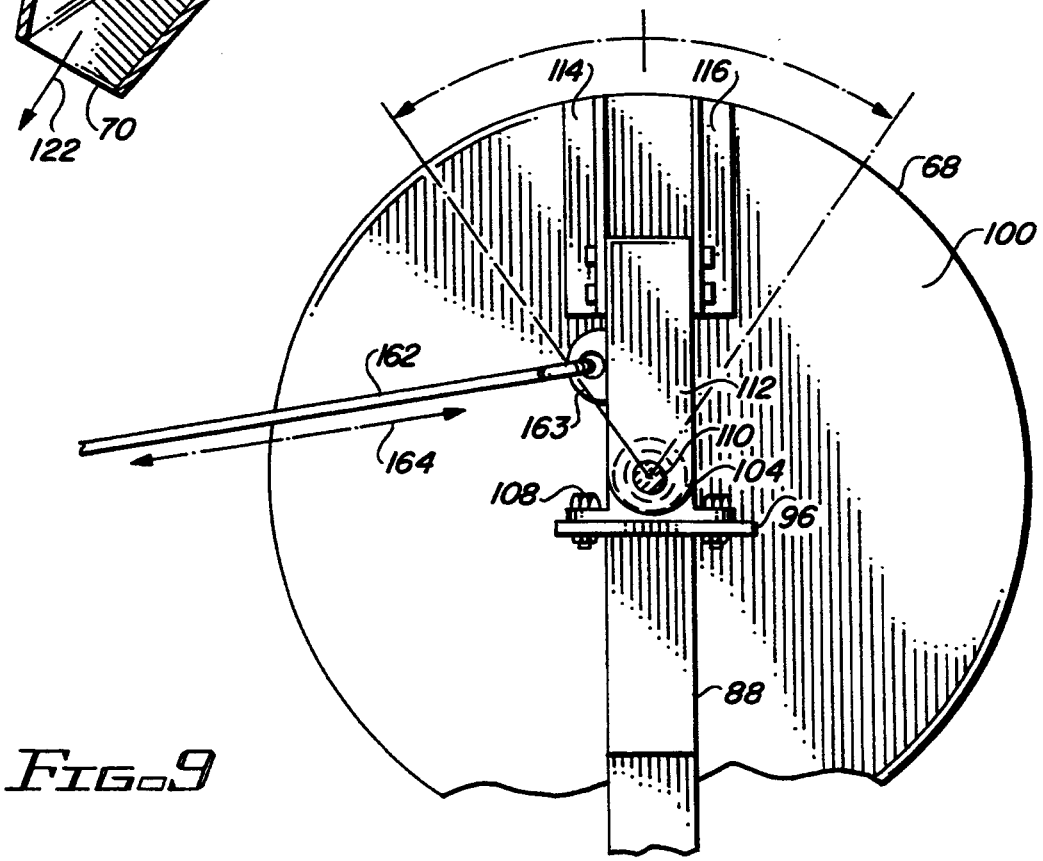
FIG. 9 is a rear view of a blower shown in FIG. 6 and illustrating the attachment of a drive linkage to the pivoting rocker arm for causing the air stream discharged by the nozzle of the fan housing to oscillate back and forth through a defined arc.

In order to oscillate fan housing 68 of blower assembly 48, a second crank arm 160 is rigidly secured to jack shaft 134 proximate pivot bearing 140. Crank member 160 duplicates the oscillating movements of crank member 146, as both such crank members are fastened to the same jack shaft 134. A further link rod 162 is coupled between crank member 160 and rocker arm 112 of fan housing 68. As indicated in FIGS. 8 and 9, one end of link rod 162 is secured to rocker arm 112 by hinged fitting 163. Link rod 162 moves back and forth generally along its longitudinal axis, as indicated by arrow 164 in FIG. 9, and swings rocker arm 112 through an arc of approximately 70 degrees. As indicated in dashed lines in FIG. 6, this causes nozzle 70 to swing back and forth through an arc of approximately 70 degrees to sweep across the upper surfaces of a vehicle passing thereunder.

Those skilled in the art will appreciate that link rods 154 and 162 are both pushed toward the center at the same time, and are both pulled away from the center at the same time. As a result, fan housings 64 and 66 are pivoted in opposing rotational directions and oscillate 180 degrees out of phase with one another. However, as noted above, the crank arms and linkages may be reconfigured, if desired, to cause fan housings 64 and 66 to oscillate in unison if desired.

The oscillation of fan housings 60 and 72 is easily understood by reference to FIG. 2. One end of link rod 166 is coupled to crank member 146 at the end thereof opposite the coupling to drive rod 148. The other end of link rod 166 is hingedly coupled to the rear wall of fan housing 60. As drive rod 148 oscillates crank member 146, such oscillations are communicated to housing 60 by link rod 166. Likewise, link rod 168 extends between crank member 150 and housing 72; as drive rod 152 oscillates crank member 150, such oscillations are communicated to housing 72 by link rod 168.

Thus, by supporting housings 60, 64, 68, and 72 for pivotal movement about the circular fans contained in each such housing, and by oscillating such housings, each such fan housing can discharge an oscillating air flow pattern without requiring extensive ducting and associated pressure losses. High efficiency is maintained, and lower air pressures, and hence lower noise levels, may be used to obtain the same volume of air flow to dry the vehicle. Moreover, because the blower assembly described herein is adapted to use several lower horsepower blower motors instead of one large horsepower blower motor, the vehicle drying apparatus is less likely to create electrical power surges on the electrical power supply line used to power such motors. The vehicle drying apparatus disclosed herein requires no more floor space than other vehicle dryers currently in use and has the further advantage of being relatively inexpensive to construct. In addition, the lack of any rubber seals or flexible hoses further minimizes required maintenance and repairs.

While the present invention has been described with respect to a preferred embodiment thereof, such description is for illustrative purposes only, and is not to be construed as limiting the scope of the invention. Various modifications and changes may be made to the described embodiment by those skilled in the art without departing from the true spirit and scope of the invention as defined by the appended claims.

I claim:

1. A blowing device for blowing a stream of air in an oscillating flow pattern, said blowing device comprising in combination:

a. a frame member:

b. a first motor for rotating a first driveshaft, said first motor being mounted to said frame member;

c. a first circular fan coupled to said first driveshaft for being rotated thereby about a first axis of rotation, said first circular fan having a centrally-located inlet for admitting air, said first circular fan having an outer periphery and causing air to be discharged from the outer periphery thereof when said first circular fan is rotated by said first motor;

d. a first housing encircling said first circular fan, said first housing receiving the air discharged from the outer periphery of said first circular fan, said first housing including an outlet nozzle for directing the discharged air through said nozzle in a predetermined direction;

e. first support means for rotatably supporting said first housing about a second axis of rotation coincident with said first axis of rotation to pivotally support said first housing about said first circular fan, said first support means including a rocker arm coupled to said first housing and rotatably supported by a bearing assembly; and f. oscillating means coupled to said frame member and further coupled to said first housing for causing said first housing to oscillate about said first circular fan in order to blow the stream of air discharged by said first circular fan in an oscillating flow pattern.

2. A vehicle dryer for blowing a plurality of streams of air in an oscillating flow pattern from above and from the side of a wet vehicle that is moved along a path extending through said vehicle dryer, said vehicle dryer comprising in combination:

a. a frame member including a horizontal portion extending above the path along which the vehicle is moved, and including at least one vertical portion extending along one side of the path along which the vehicle is moved;

b. a first motor for rotating a first driveshaft, said first motor being mounted to the horizontal portion of said frame member extending above said path;

c. a first circular fan coupled to said first driveshaft for being rotated thereby about a first axis of rotation, said first circular fan having a centrally-located inlet for admitting air, said first circular fan having an outer periphery and causing air to be discharged from the outer periphery thereof when said first circular fan is rotated by said first motor;

d. a first housing encircling said first circular fan, said first housing receiving the air discharged from the outer periphery of said first circular fan, said first housing including an outlet nozzle for directing the discharged air through said nozzle as a first stream of air in a predetermined direction generally downward toward said path;

e. first support means for rotatably supporting said first housing about a second axis of rotation coincident with said first axis of rotation to pivotally support said first housing about said first circular fan;

f. a second motor for rotating a second driveshaft, said second motor being mounted to the at least one vertical portion of said frame member extending along one side of said path;

g. a second circular fan coupled to said second driveshaft for being rotated thereby about a third axis of rotation, said second circular fan having a centrally-located inlet for admitting air, said second circular fan having an outer periphery and causing air to be discharged from the outer periphery thereof when said second circular fan is rotated by said second motor;

h. a second housing encircling said second circular fan, said second housing receiving the air discharged from the outer periphery of said second circular fan, said second housing including an outlet nozzle for directing the discharged air through said nozzle as a second stream of air in a predetermined direction generally transversely across said path.

i. second support means for rotatably supporting said second housing about a fourth axis of rotation coincident with said third axis of rotation to pivotally support said second housing about said second circular fan; and j. oscillating means coupled to said frame member and further coupled to said first and second housings for causing said first and second housings to oscillate about said first and second circular fans, respectively, in order to blow the stream of air discharged by said first circular fan in an oscillating flow pattern.

3. The vehicle dryer recited by claim 2 wherein said oscillating means is coupled to said first support means and to said second support means, said first support means coupling said oscillating means to said first housing, and said second support means coupling said oscillating means to said second housing.

4. The vehicle dryer recited by claim 2 wherein said oscillating means includes a third motor coupled to said frame member.

5. The vehicle dryer recited by claim 4 wherein said oscillating means further includes an eccentric crank arm rotated by said third motor, said oscillating means also including a linkage extending from said eccentric crank arm to said first housing and to said second housing.

6. A vehicle dryer for blowing a stream of air in an oscillating flow pattern generally toward a wet vehicle, said vehicle dryer comprising in combination:

a. a frame member;

b. a first motor for rotating a first driveshaft, said first motor being mounted to said frame member;

c. a first circular fan coupled to said first driveshaft for being rotated thereby about a first axis of rotation, said first circular fan having a centrally-located inlet for admitting air, said first circular fan having an outer periphery and causing air to be discharged from the outer periphery thereof when said first circular fan is rotated by said first motor;

d. a first housing encircling said first circular fan, said first housing receiving the air discharged from the outer periphery of said first circular fan, said first housing including an outlet nozzle for directing the discharged air through said nozzle in a predetermined direction;

e. first support means for rotatably supporting said first housing about a second axis of rotation coincident with said first axis of rotation to pivotally support said first housing about said first circular fan; and f. oscillating means coupled to said frame member and further coupled to said first housing for causing said first housing to oscillate about said first circular fan in order to blow the stream of air discharged by said first circular fan in an oscillating flow pattern;

g. said outlet nozzle of said first housing being centrally aligned with said first and second axes of rotation for directing the stream of discharged air along a path extending generally radially outward from said first and second axes of rotation.

7. A vehicle dryer as recited by claim 6 wherein said outlet nozzle includes an inlet opening disposed closest to the outer periphery of said first circular fan for receiving discharged air, said outlet nozzle further including an outlet opening opposite said inlet opening for releasing the discharged air, said inlet opening being larger than said outlet opening, and said nozzle tapering from said inlet opening toward said outlet opening for compressing air discharged through said nozzle.

8. The blowing device recited by claim 1 wherein said bearing assembly rotatably supports said rocker arm about a pivot axis that is coaxial with said first axis of rotation about which said first circular fan is rotated.

* * * * *